(No Model.) 2 Sheets—Sheet 1.

A. J. LERCH.
AUTOMATIC ATTACHMENT FOR MOLDING MACHINES.

No. 585,886. Patented July 6, 1897.

WITNESSES
C. N. Benjamin
Phil. A. Turner

INVENTOR
Andrew J. Lerch
BY
Cary & Deemer
ATTORNEYS (No Model.) 2 Sheets—Sheet 2.
A. J. LERCH.
AUTOMATIC ATTACHMENT FOR MOLDING MACHINES.
No. 585,886. Patented July 6, 1897.
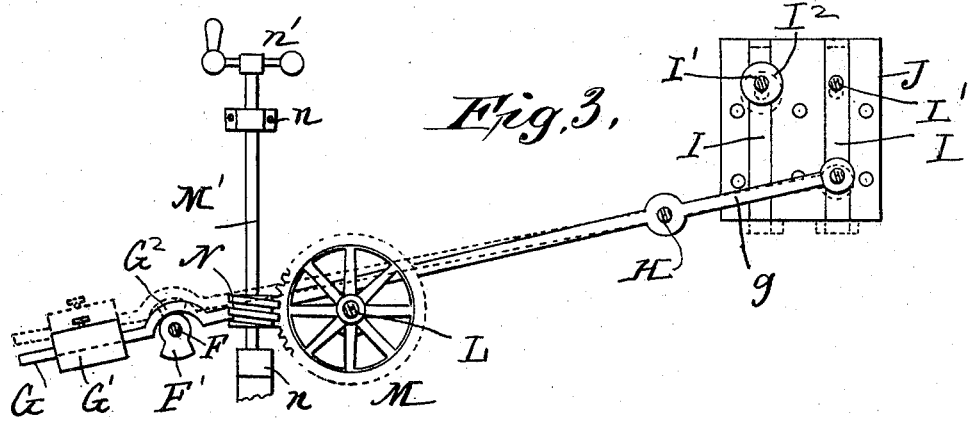
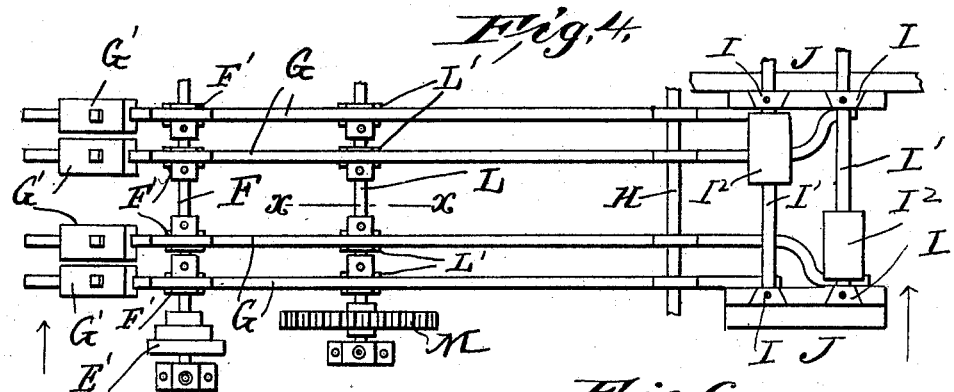
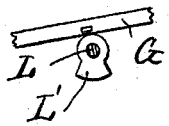
WITNESSES
INVENTOR
Andrew J. Lerch
BY
ATTORNEYS

UNITED STATES PATENT OFFICE.

ANDREW J. LERCH, OF LANCASTER, PENNSYLVANIA.

AUTOMATIC ATTACHMENT FOR MOLDING-MACHINES.

SPECIFICATION forming part of Letters Patent No. 585,886, dated July 6, 1897.

Application filed August 12, 1896. Serial No. 602,486. (No model.)

*To all whom it may concern:*

Be it known that I, ANDREW J. LERCH, a citizen of the United States, and a resident of Lancaster, county of Lancaster, and State of Pennsylvania, have invented certain new and useful Improvements in Automatic Attachments for Molding-Machines, of which the following is a specification, reference being had to the accompanying drawings, forming a part thereof, in which similar letters and figures of reference indicate corresponding parts.

This invention relates to an improved automatic attachment for molding-machines, the objects of the invention being to provide a device adaptable for attachment to any molding-machine and for molding wainscoting and other plain or molded work at interspaces or otherwise, as required, or for grooving and recessing woodwork of any character. With these and other objects in view I employ the novel construction which will be hereinafter fully described, and specifically set forth in the annexed claims.

Figure 1:
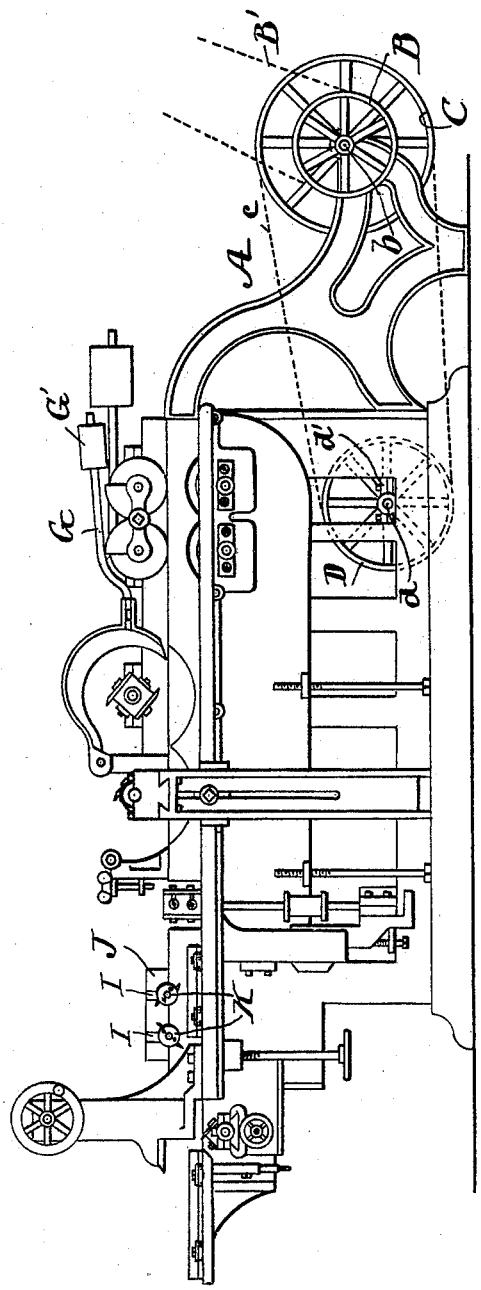
Figure 2:
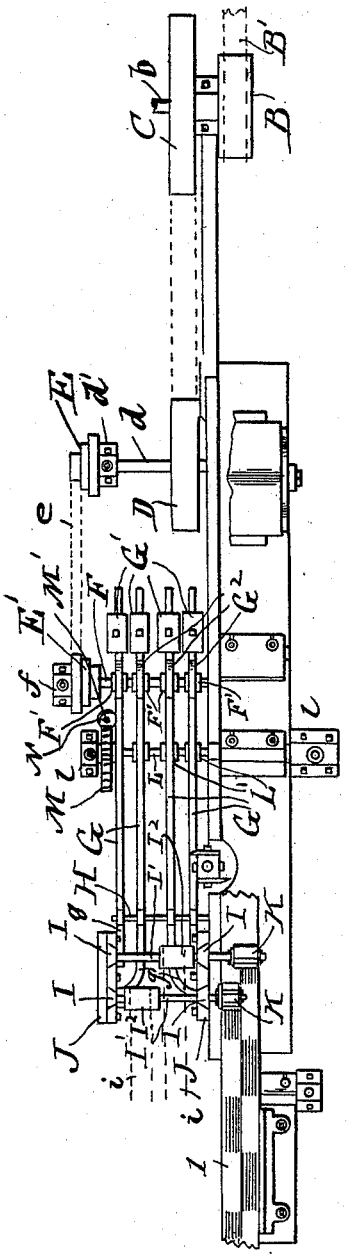

In the accompanying drawings, forming part of this specification, Figure 1 is a side view of a molding-machine having my improvement attached thereto. Fig. 2 is a plan view of the same with a portion of the machine broken away. Fig. 3 is a side elevation of my improved attachment as it will appear from the opposite side of the machine. Fig. 4 is a plan view thereof. Fig. 5 is a cross-sectional detail view taken on a line $x$ $x$ of Fig. 4; and Figs. 6, 7, and 8 are face views of products of the machine, illustrating some of the styles of molding produced by the same.

In the practice of my invention as illustrated in the drawings, A represents the main frame of a molding-machine; B, the driving-pulley therefor; C, another driving-pulley attached to the shaft $b$, which carries the pulley B. These said pulleys are adapted to be revolved by means of any suitable belt B'.

The pulley C is connected by means of a belt $c$ to a pulley D, which said pulley is mounted upon a shaft $d$, which is journaled in suitable boxes $d'$. Mounted also upon the shaft $d$ is a cone-pulley E, which is connected to a cone-pulley E' by means of a belt $e$. The cone-pulley E' is mounted upon a suitable shaft F, which is journaled in boxes $f$. Upon this said shaft F, I mount a series of sliding cams F', and these said cams are adapted to vibrate a series of rods G, which said rods are mounted upon a stationary shaft H. The short arms $g$ of these said rods G are pivotally connected to vertical slides I, which said slides are dovetailed to stationary plates J, which are attached to the molding-machine. The said slides I are connected to each other by means of cross-shafts I', which said shafts have cutters K attached to their outer ends, and they are adapted to be driven by pulleys $I^2$ of suitable belts $i$.

To maintain the rods G in normal engagement with the cams F', they are provided with weights G', and to form a bearing for the said cams the arms are provided with segmental projections $G^2$, whereby when the cams are revolved in the position indicated by dotted lines in Fig. 3 of the drawings the slides are carried to a downward position, whereby their knives can mold or ornament the material 1, as illustrated in Fig. 2 of the drawings.

When the cams F' are in the position illustrated by full lines in Fig. 3 of the drawings, the slides and their knives are carried upwardly out of contact with the material, whereby plain surfaces are left thereon.

As a means for independently operating the slides whereby they may be all thrown simultaneously into or out of action, I provide an auxiliary shaft L, which said shaft is suitably journaled in bearings $l$. This shaft is supplied with a series of cams L', and to the outer end thereof is attached a toothed pinion M, which meshes with a worm-wheel N. This said wheel is mounted upon a vertical shaft M', which is suitably journaled in boxes $n$, and it is adapted to be operated by the handle-lever $n'$.

In the operation of my invention, rotary motion being applied to the driving-pulley B, said motion will be transmitted to the shaft F, whereby the cams F' will alternately raise or lower the cutters K, through the medium of their slides I, whereby the work can be ornamentally molded in interspaces, as indicated in Fig. 2 of the drawings, and also in Figs. 6, 7, and 8.

By a variable arrangement of the cams the cutters can be made to operate simultaneously for molding the entire surface of the piece of material, or any set of cams or any one cam may be moved out of engagement with the rods, whereby an operator can produce molding of variable designs, some of which are illustrated in Figs. 6, 7, and 8 of the drawings.

I do not confine myself to the use of any specific molding-machine, nor to a specific motion of driving; nor do I confine myself to the specific details of construction relative to my improved molding-machine attachment as illustrated in the drawings, as it is obvious that under the scope of my invention I am entitled to variations in mere mechanical detail and structure.

Having thus described my invention, what I claim as new, and desire to secure by Letters Patent, is—

1. The combination with a molding-machine of a series of vertical slides dovetailed thereto, cross-shafts connecting said slides, said shafts having cutters attached thereto and means for revolving the said shafts and cutters, a series of swinging rods for throwing the said slides alternately in an upward and downward position, a series of cams for throwing the said rods, said cams being mounted upon a cross-shaft, and means for revolving the said shaft, substantially as shown and described.

2. In an attachment for molding-machines, the combination of a series of swinging rods, G, mounted on shaft H, said rods being adapted to be vibrated by cams F', mounted on shaft F, vertical slides I, pivotally connected to said rods G, and dovetailed to stationary plates J, cross-shafts I' connecting said slides, cutters K attached to the outer end of shafts I', weights G', adapted to maintain rods J, in normal engagement with cams F' and segmental projections or bearings $G^2$, whereby the slides are moved in downward position, substantially as shown and described.

3. In an attachment for molding-machines of the character described, the combination, with the rods G, slides I, and shafts I', carrying the cutters K, of an auxiliary shaft L, journaled in bearings $l$, a series of cams L', mounted on said shaft L, toothed pinion M, attached to the outer end of said shaft and meshing with the worm-wheel N, mounted on shaft M', journaled in boxes $n$, and the handle-lever $n'$, adapted to operate said wheel, whereby the slides may all be simultaneously thrown into or out of action, substantially as shown and described.

In testimony that I claim the foregoing as my invention I have signed my name, in presence of two witnesses, this 1st day of August, 1896.

ANDREW J. LERCH.

Witnesses:
  WM. O. FRAILEY,
  W. A. HALDY.